(12) United States Patent
Frank et al.

(10) Patent No.: US 7,918,596 B2
(45) Date of Patent: Apr. 5, 2011

(54) WARNING LIGHT

(75) Inventors: George Frank, Crown Point, IN (US);
Paul Gergets, St. John, IN (US); Vince Fleszewski, Crown Point, IN (US);
Robert Czajkowski, Tinley Park, IL (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 11/788,488

(22) Filed: Apr. 20, 2007

(65) Prior Publication Data
US 2008/0259601 A1 Oct. 23, 2008

(51) Int. Cl.
*B60Q 1/52* (2006.01)
(52) U.S. Cl. ........ 362/542; 362/493; 362/516; 362/241; 362/800
(58) Field of Classification Search ............ 362/542, 362/493, 516, 241
See application file for complete search history.

(56) References Cited

U.S. PATENT DOCUMENTS

| | | | |
|---|---|---|---|
| 4,733,335 A * | 3/1988 | Serizawa et al. ............ 362/503 |
| 5,365,411 A * | 11/1994 | Rycroft et al. ................ 362/20 |
| 5,528,474 A | 6/1996 | Roney et al. |
| 5,694,112 A | 12/1997 | VannRox et al. |
| 5,857,767 A | 1/1999 | Hochstein |
| 5,929,788 A * | 7/1999 | Vukosic ..................... 340/908.1 |
| 6,220,722 B1 | 4/2001 | Begemann |
| 6,380,865 B1 | 4/2002 | Pederson |
| 6,461,008 B1 * | 10/2002 | Pederson ....................... 362/35 |
| 6,563,139 B2 | 5/2003 | Hen |
| 6,712,486 B1 | 3/2004 | Popovich et al. |
| 6,717,526 B2 * | 4/2004 | Martineau et al. ....... 340/815.45 |
| 6,778,078 B1 * | 8/2004 | Han et al. ..................... 340/474 |
| 6,793,374 B2 | 9/2004 | Begemann |
| 6,880,951 B2 | 4/2005 | Yoon |
| 6,885,033 B2 | 4/2005 | Andrews |
| 6,942,360 B2 | 9/2005 | Chou et al. |
| 7,210,834 B2 * | 5/2007 | Sazuka et al. ................ 362/548 |
| 7,261,447 B2 * | 8/2007 | Menke et al. ................ 362/503 |
| 7,377,674 B2 * | 5/2008 | Klinkman et al. ........... 362/484 |
| 2004/0041757 A1 | 3/2004 | Yang et al. |
| 2004/0095738 A1 | 5/2004 | Juang |
| 2004/0099874 A1 | 5/2004 | Chang et al. |
| 2004/0245591 A1 | 12/2004 | Wang et al. |

(Continued)

FOREIGN PATENT DOCUMENTS
EP 01479286 11/2004
(Continued)

OTHER PUBLICATIONS

U.S. Appl. No. 11/788,487, filed Apr. 20, 2007, Frank et al.
(Continued)

*Primary Examiner* — Jong-Suk (James) Lee
*Assistant Examiner* — Leah S Lovell
(74) *Attorney, Agent, or Firm* — Merchant & Gould P.C.

(57) ABSTRACT

A warning light and warning light assembly are disclosed. The warning light includes a housing including a base and a translucent cover. The warning light includes one or more light emitting diodes within the housing, each of the light emitting diodes operable to emit light substantially along an optical output axis. The warning light also includes a reflector within the housing, the reflector including a reflective surface having a curve section disposed substantially perpendicular to the optical output axis of at least one of the one or more light emitting diodes.

10 Claims, 10 Drawing Sheets

U.S. PATENT DOCUMENTS

| | | | |
|---|---|---|---|
| 2005/0045901 | A1 | 3/2005 | Wall |
| 2005/0067942 | A1 | 3/2005 | Coushaine |
| 2005/0083698 | A1 | 4/2005 | Zampini et al. |
| 2005/0094393 | A1 | 5/2005 | Czajkowski |
| 2007/0153530 | A1 | 7/2007 | Czajkowski |
| 2008/0000024 | A1 | 1/2008 | Grosz |
| 2008/0080189 | A1* | 4/2008 | Wang ............................ 362/294 |

FOREIGN PATENT DOCUMENTS

| | | |
|---|---|---|
| EP | 01511090 | 3/2005 |
| WO | WO 01/29479 | 4/2001 |
| WO | WO 03/107423 | 12/2003 |
| WO | WO 2004/082021 | 9/2004 |

OTHER PUBLICATIONS

Bingqian, Li, "A new type high power lighting emitting diodes based on MCPCB and its optoelectrical characteristics," Acta Phtonica Sinica, vol. 34, No. 3, pp. 372-374, Mar. 2005.

Maksymyk, Ivan, "Fiber-delivered halogen serves as workhorse for machine vision," Laser Focus World, vol. 41, No. 9, pp. 72-75, Sep. 2005.

Petroski, J., "Spacing of high-brightness LED's on metal substrate PCB's for proper thermal performance," The Ninth Intersociety Conference on Thermal and Thermomechanical Phenomena in Electronic Systems, vol. 2, pp. 507-514, 2004.

Lenderink, et al., "Dynamic road marking module using chip-on-board phosphor-converted white LEDs with application-specific primary optics," Light Sources, pp. 229-230, 2004.

Bausewein, M., "Cooling of light emitting diode (LED) systems," Elektron.Prax, No. 21, pp. 76-80, Nov. 2004.

Compiani, R., "Optical components for visual displays," Elettronica Oggi, No. 265, pp. 57-61, Nov. 1998.

Asai, et al., "Heat conductive wire matrix board for light emitting diode (LED) dot matrix display," Circuit World, vol. 21, No. 4, pp. 27-31, Jul. 1995.

Kelly, W., "Superior LED ringlights using new lens technology," Image Processing and Machine Vision, pp. 179-184, 2000.

"COBRA 500 high intensity LED line light," Laser Focus World, vol. 40, No. 6, Jun. 2004.

"3W power-LED module features 90-lumen brightness (Optoelectronics/Displays)," EDN, vol. 50, No. 22, Oct. 2005.

"LED encapsulants cure fast (Spotlight: electronic displays)," Canadian Electronics, vol. 19, No. 2, pp. 16(1), Mar. 2004.

"StockerYale offers new LED lighting source," Military & Aerospace Electronics, vol. 14, No. 11, pp. 6(1), Nov. 2003.

"Mini Led line light," Laser Focus World, vol. 39, No. 6, pp. SS9(1), Jun. 2003.

www.whelen.com from Internet Archive, dated Sep. 10, 2005.

www.weldoninc.com from Internet Archive dated Oct. 25, 2005.

"700 Series Super-LED Lightheads" http://web.archive.org/web/20051108072043/automotive.whelen.com/static/p489.htm.

www.911ep.com from Internet Archive, dated Nov. 3, 2005.

"600 Series Super-LED Lightheads" http://web.archive.org/web/20051108072020/automotive.whelen.com/static/p488.htm.

www.code3pse.com from Internet Archive, dated Sep. 7, 2005.

http://web.archive.org/web/20051201155052/www.code3pse.com/product.asp?grp+pse&familyid=19&flag=N.

www.tomar.com from Internet Archive, Sep. 11, 2005.

* cited by examiner

WARNING LIGHT

TECHNICAL FIELD

The present disclosure relates generally to lighting and reflector systems. In particular, the present disclosure relates to a warning light useable on motor vehicles.

BACKGROUND OF THE INVENTION

Ambulances, fire trucks, police cars, and other emergency vehicles utilize warning lights to produce light signals of various colors and patterns. These warning lights must provide a bright, reliable light signal under all operational conditions encountered by the emergency vehicle on which the light is installed. The warning lights must therefore be temperature and moisture resistant, as well as resilient to vibration or other physical stresses during operation.

Obtaining desirable operational characteristics in a warning light can be difficult to achieve in a low power, small size, easy to use assembly. For example, mechanical or electrical structures may be incorporated into the warning light to assist with reliability, but may add size or weight to the warning light, or may otherwise increase the heat generation of the warning light. Or, in order to reduce heat dissipation, a lower power light source may be used; however, such a design choice can result in a dimmer light production than otherwise would be available.

Certain light assemblies use light emitting diodes (LEDs) as a light source. The light output of an LED can be highly directional. This directionality has been a detriment when trying to couple LEDs with parabolic reflectors in lighting assemblies. The directionality of an LED, taken together with the desire to shape the light output in different and sometimes opposite ways to yield a desired performance specification, has resulted in LED lighting systems that frequently employ lens elements in addition to reflectors to shape the beam. These LED-lens-reflector systems can suffer from poor optical efficiency, as well as the above-stated problems.

For these and other reasons, improvements are desired.

SUMMARY

The above and other problems are addressed by the following:

In one aspect, a warning light is disclosed. The warning light includes a housing including a base and a translucent cover. The warning light includes one or more light emitting diodes within the housing, each of the light emitting diodes operable to emit light substantially along an optical output axis. The warning light also includes a reflector within the housing, the reflector including a reflective surface having a curve section disposed substantially perpendicular to the optical output axis of at least one of the one or more light emitting diodes.

In a second aspect, a warning light assembly is disclosed. The warning light assembly includes a warning light, a base plate, and a flared warning light frame configured to surround a perimeter of the warning light. The warning light includes a housing having a base and a translucent cover. The warning light also includes one or more light emitting diodes within the housing, each of the light emitting diodes operable to emit light substantially along an optical output axis. The warning light further includes a reflector resident within the housing, the reflector including a reflective surface having a curve section disposed substantially perpendicular to the optical output axis of at least one of the one or more light emitting diodes.

In a third aspect, an emergency vehicle having at least one warning light installed thereon is disclosed. The warning light includes a housing including a base and a translucent cover. The warning light includes one or more light emitting diodes within the housing, each of the light emitting diodes operable to emit light substantially along an optical output axis. The warning light also includes a reflector within the housing, the reflector including a reflective surface having a curve section disposed substantially perpendicular to the optical output axis of at least one of the one or more light emitting diodes.

DETAILED DESCRIPTION

The present disclosure relates to a warning light and a warning light assembly useable on a motor vehicle. In certain embodiments, the warning light and warning light assembly are useable on an emergency vehicle, such as a fire truck, an ambulance, or other emergency response vehicle. Other applications, such as use on buildings, signs, or other stationary structures are possible as well.

FIGS. 1-4 show a warning light assembly 100 according to a possible embodiment of the present disclosure. The warning light assembly 100 is configured to be mounted to a motor vehicle, such as an emergency vehicle. The warning light assembly 100 includes a warning light 102, a warning light frame 104, and a base plate 106.

Figure 1:
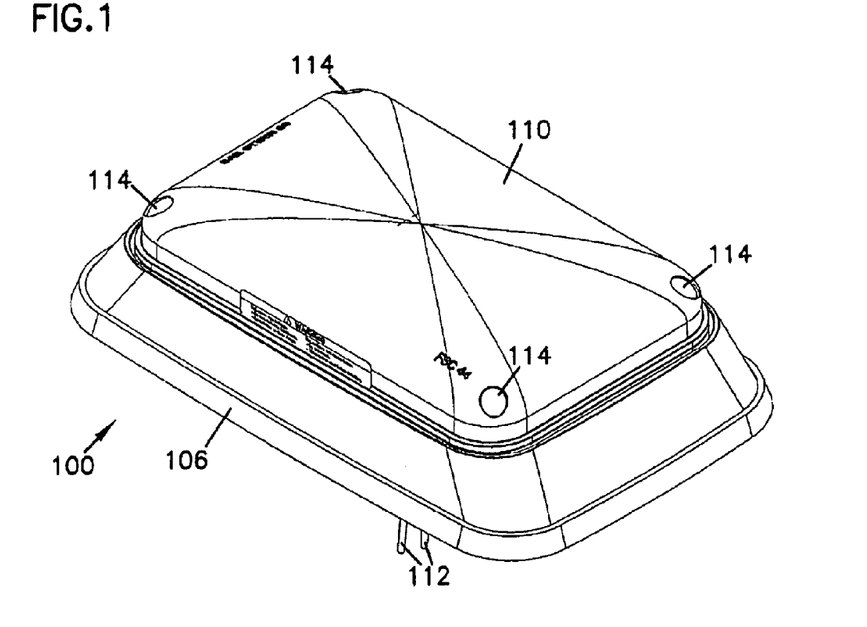
FIG. 1 is an angled perspective view of a warning light assembly according to a possible embodiment of the present disclosure.
Figure 2:
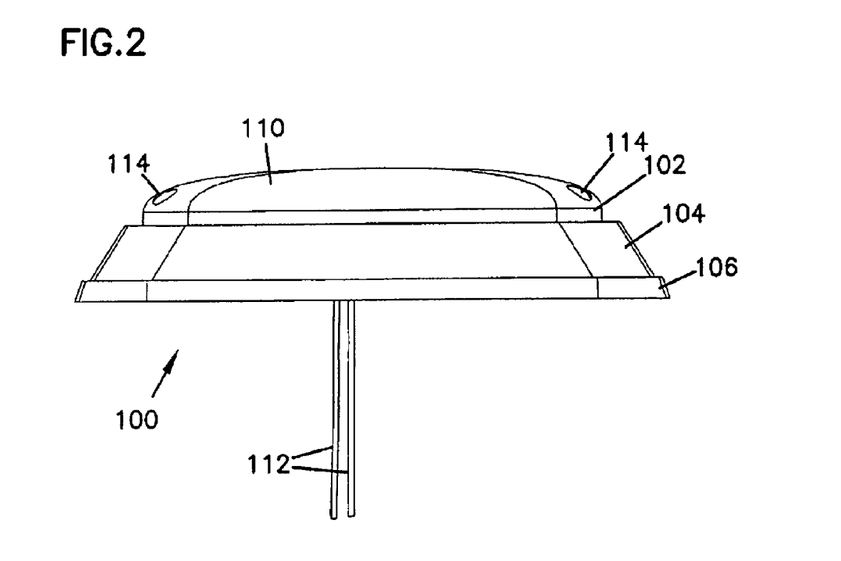
FIG. 2 is an exploded perspective view of the warning light assembly of FIG. 1.
Figure 3:
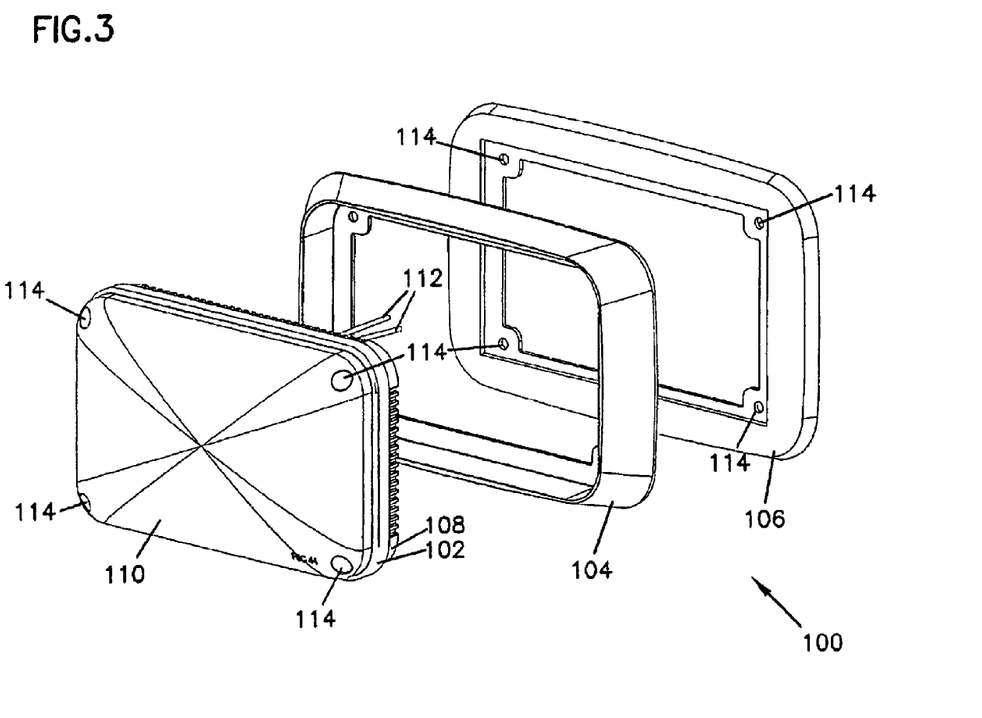
FIG. 3 is a side elevation view of the warning light assembly of FIG. 1.
Figure 4:
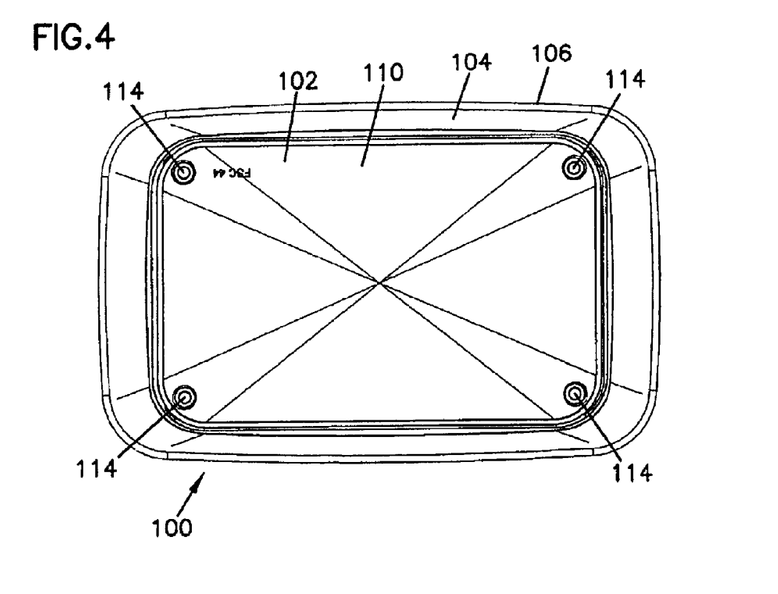
FIG. 4 is a top plan view of the warning light assembly of FIG. 1.
Figure 5:
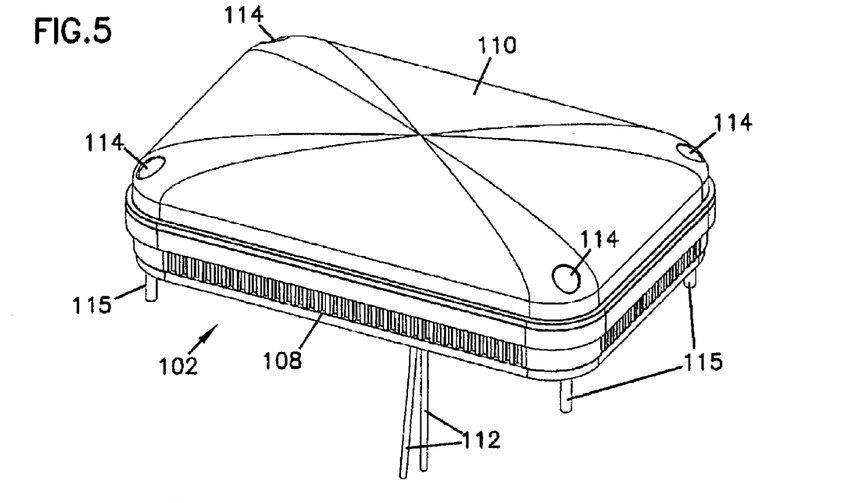
FIG. 5 is an angled perspective view of a warning light according to a possible embodiment of the present disclosure.
Figure 6:
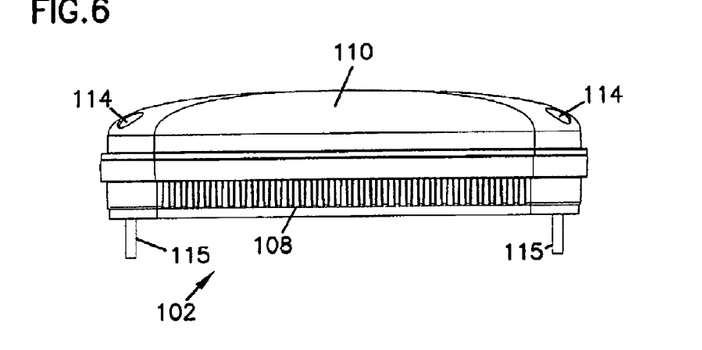
FIG. 6 is a side elevation view of the warning light of FIG. 5.
Figure 7:
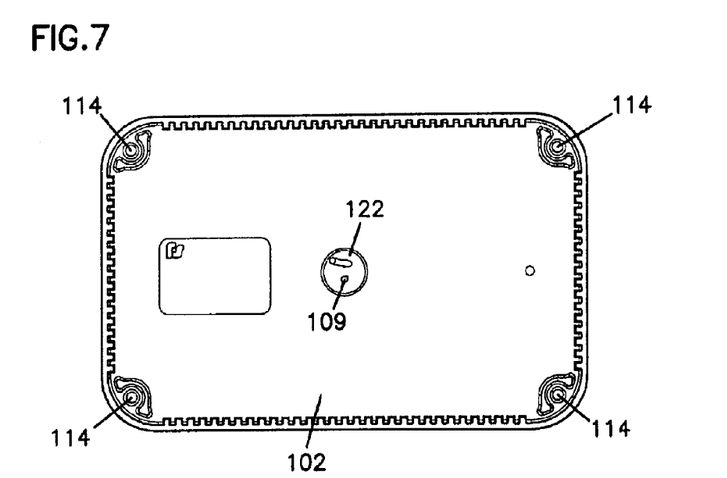
FIG. 7 is a bottom plan view of the warning light of FIG. 5.
Figure 8:
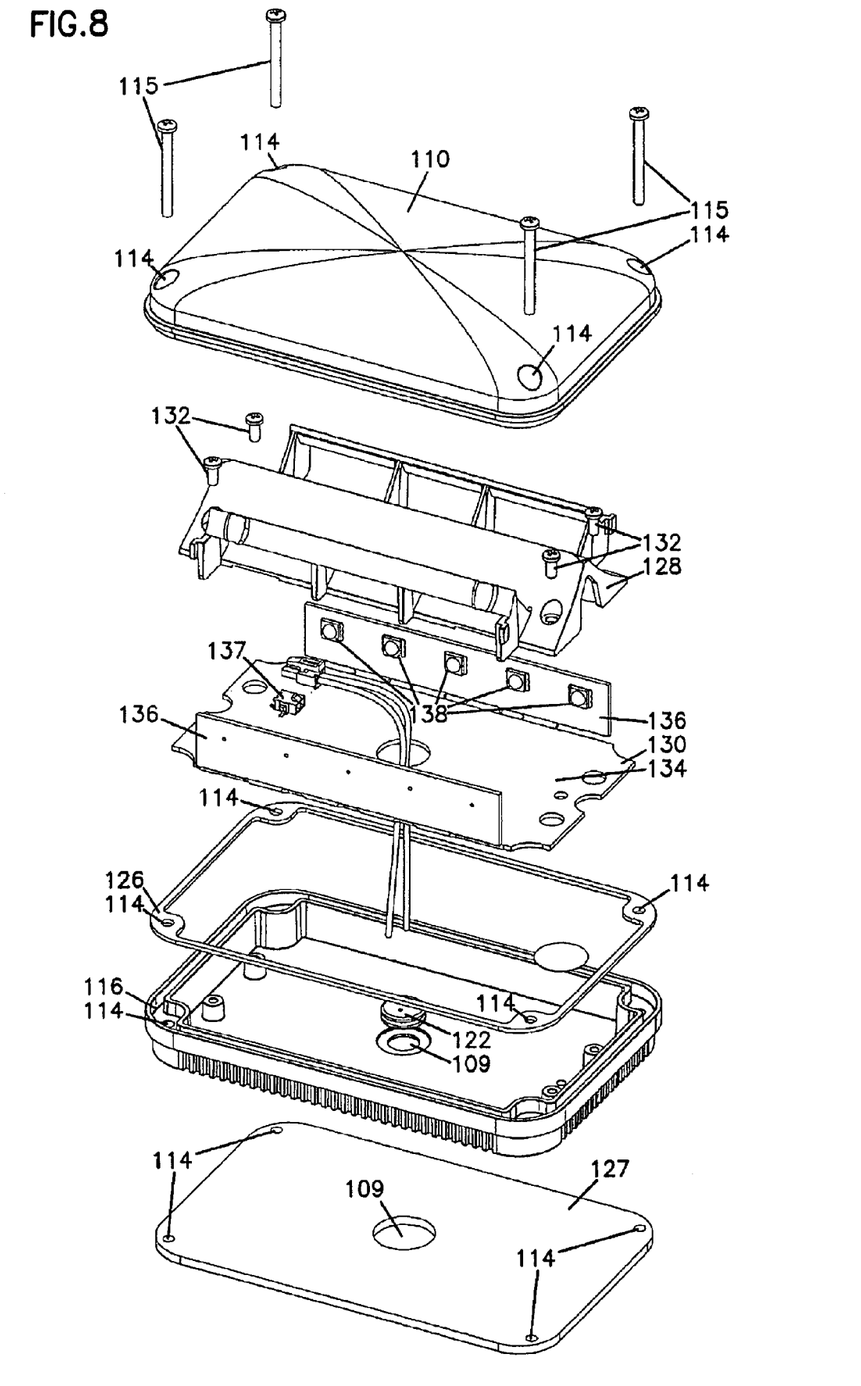
FIG. 8 is an exploded view of the warning light of FIG. 5.
Figure 9:
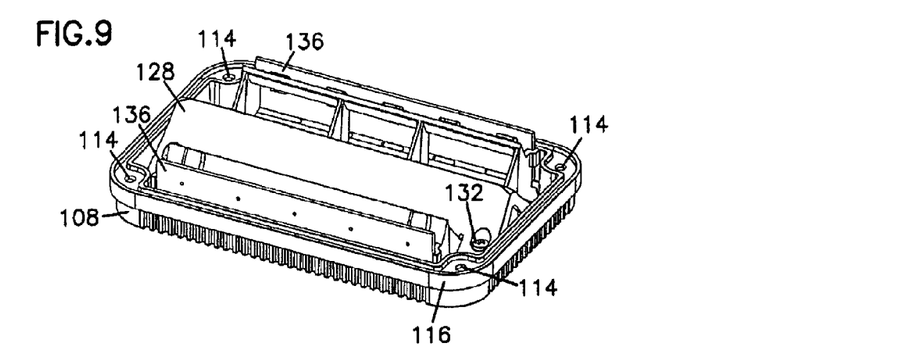
FIG. 9 is an angled perspective view of the warning light of FIG. 5 with the translucent cover removed.
Figure 10:
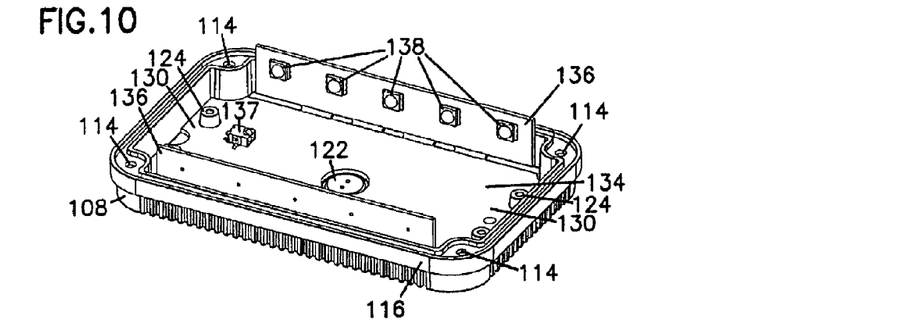
FIG. 10 is an angled perspective view of the warning light of FIG. 5 with the translucent cover and reflector removed to expose a circuit board.
Figure 11:
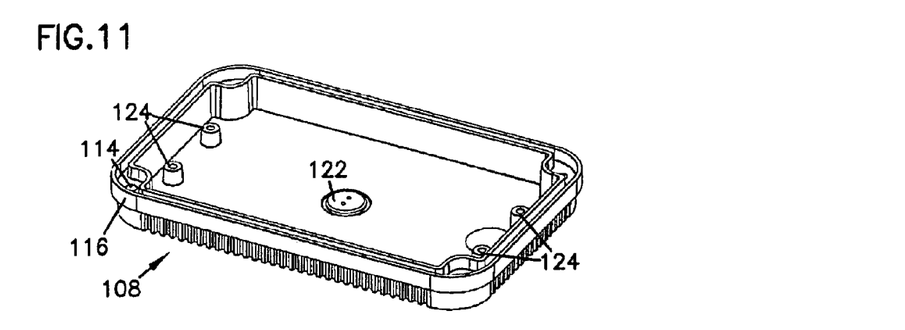
FIG. 11 is an angled perspective view of the warning light of FIG. 5 with the translucent cover, reflector, and circuit board removed.
Figure 12:
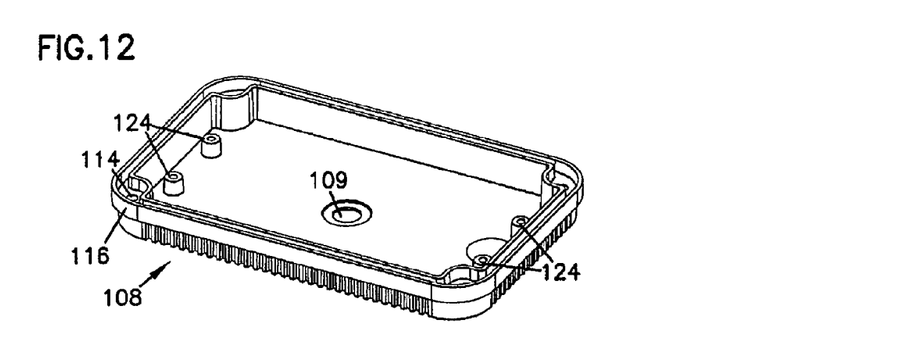
FIG. 12 is an angled perspective view of a warning light base useable in the warning light of FIG. 5.
Figure 13:
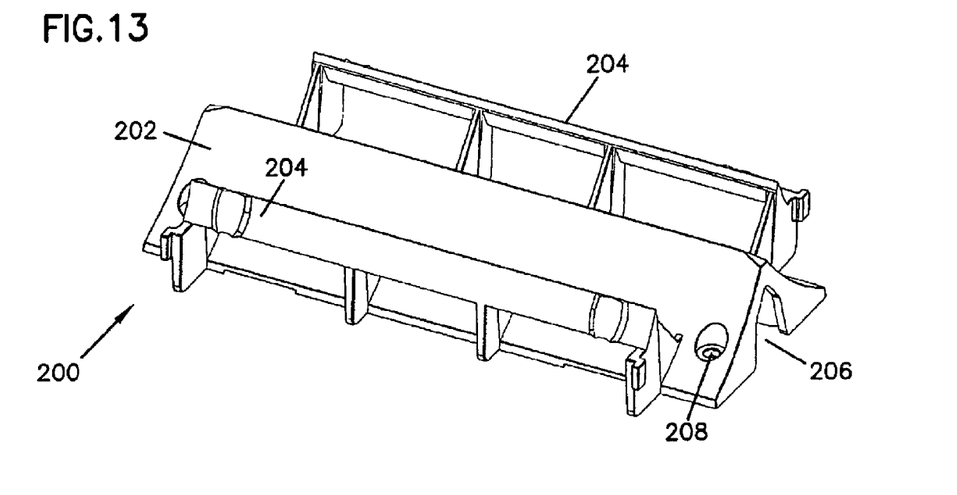
FIG. 13 is a top perspective view of a reflector useable in the warning light of FIG. 5.
Figure 14:
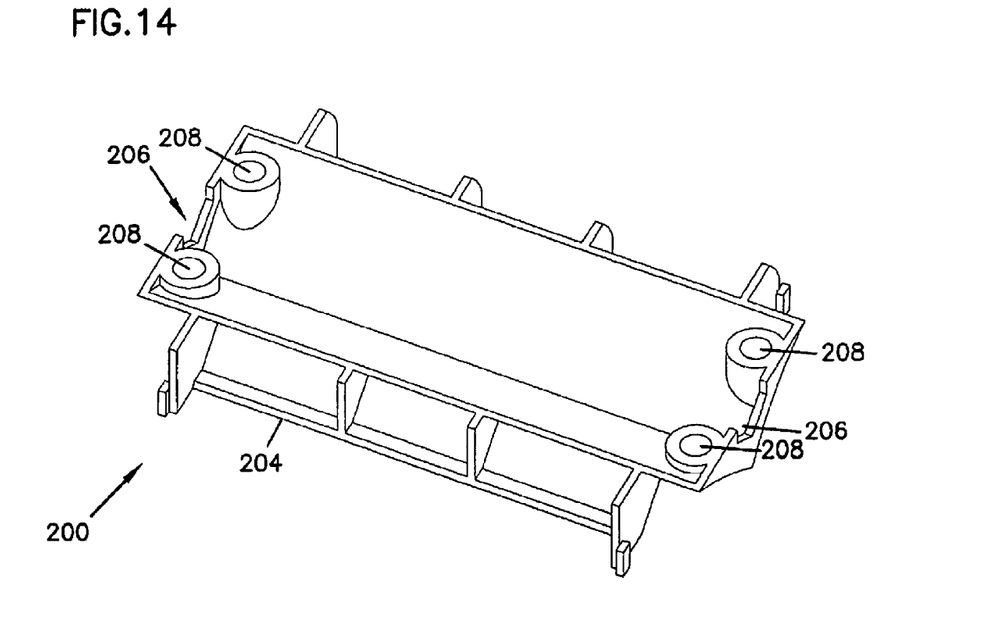
FIG. 14 is a bottom perspective view of the reflector of FIG. 13.
Figure 15:
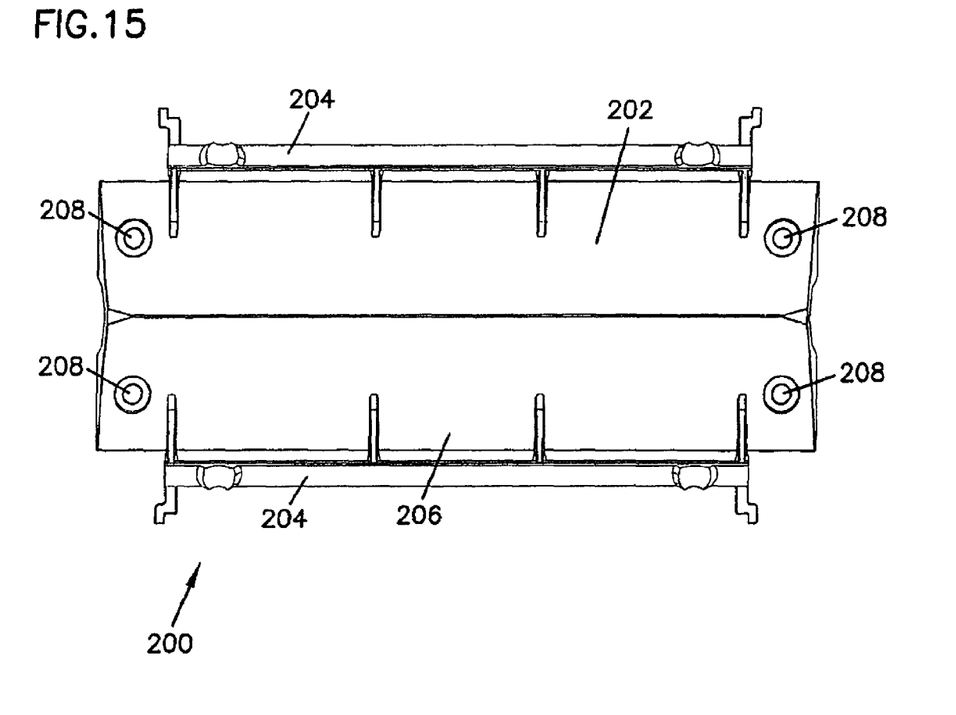
FIG. 15 is a top view of the reflector of FIG. 13.
Figure 16:
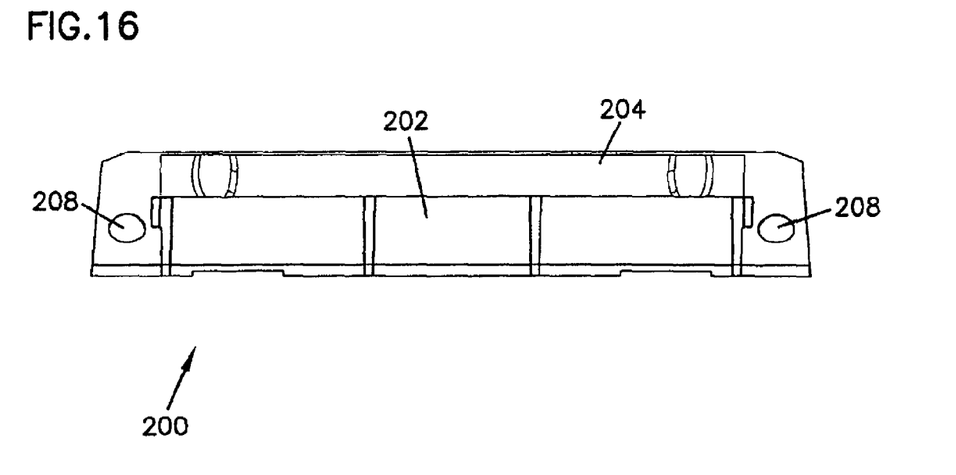
FIG. 16 is a side elevation view of the reflector of FIG. 13.
Figure 17:
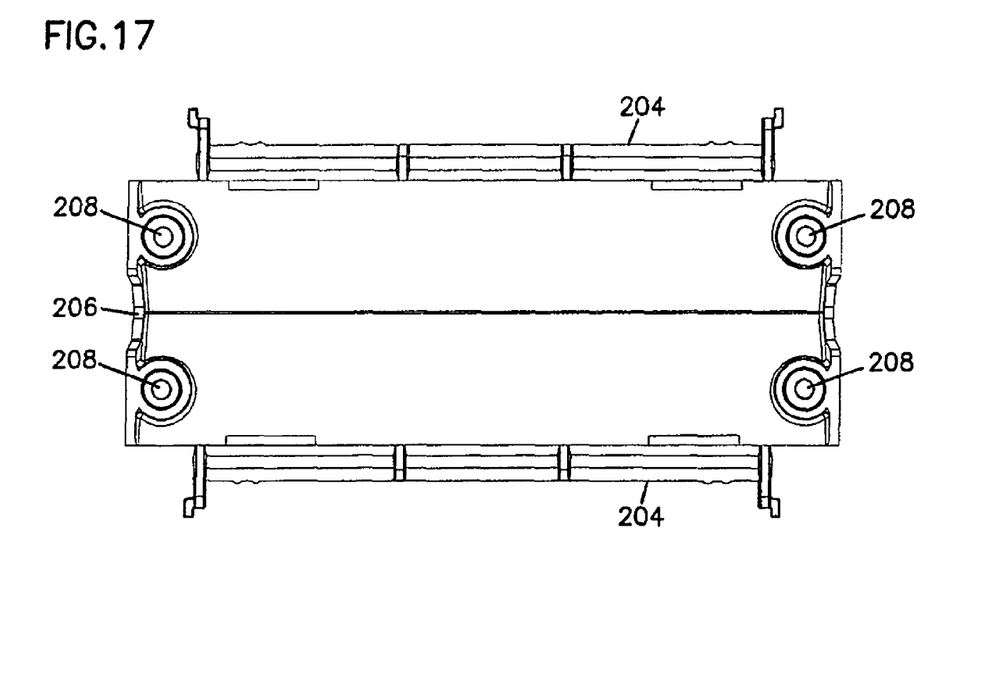
FIG. 17 is a bottom view of the reflector of FIG. 13.
Figure 18:
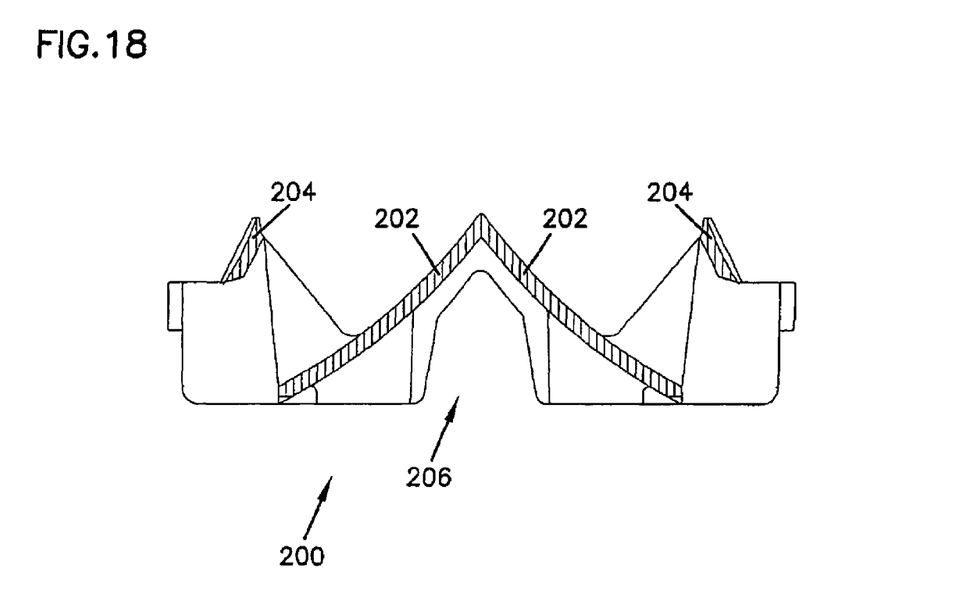
FIG. 18 is a side elevation view of the reflector of FIG. 13, perpendicular to the side elevation view of FIG. 16.
Figure 19:
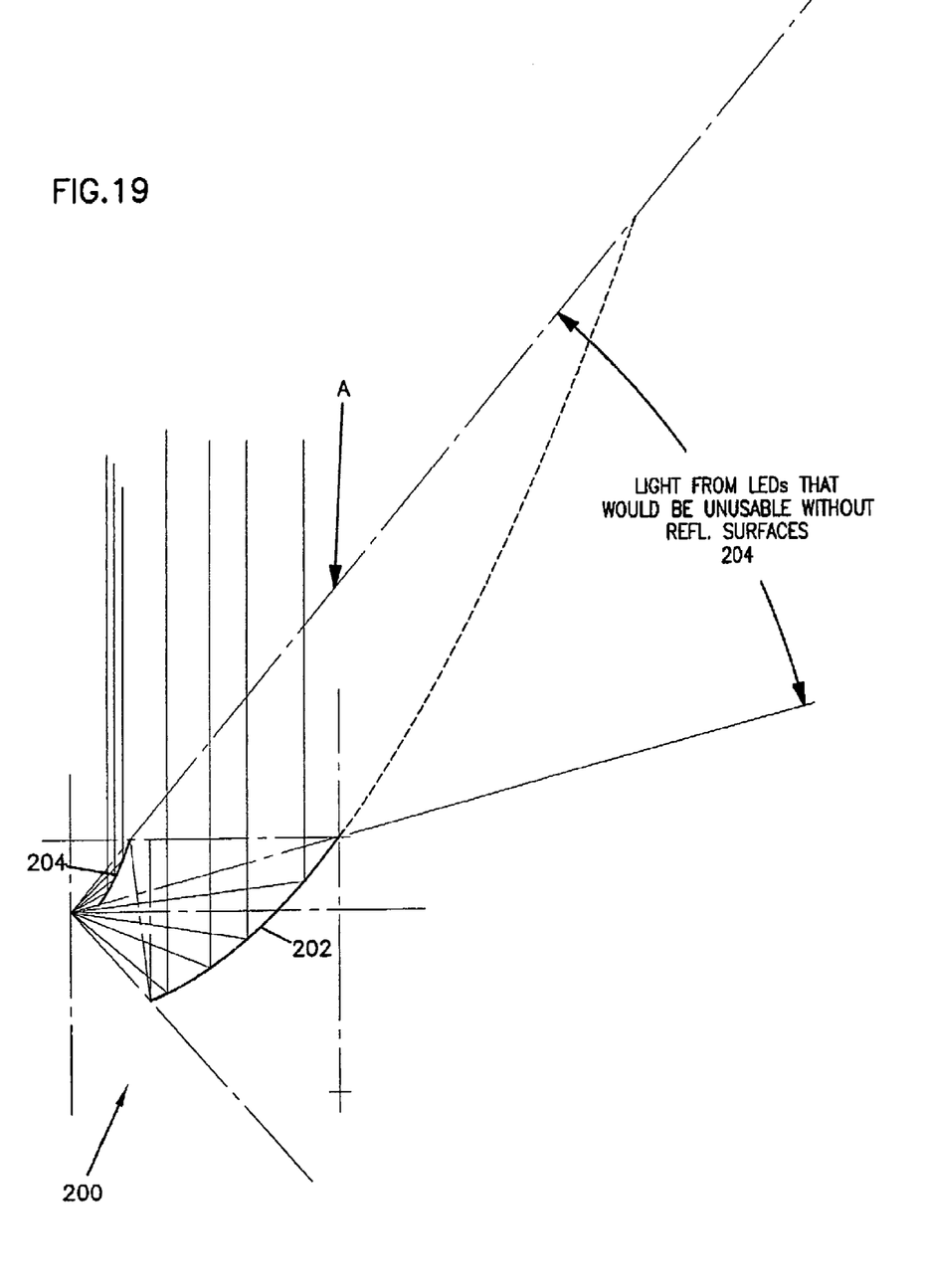
FIG. 19 is a side optical schematic view of a portion of the reflector of FIG. 13.

The warning light 102, shown isolated from the frame 104 and base plate 106 in FIGS. 5-7, is designed to provide a high intensity light signal, while at the same time maintaining low power consumption in a low-profile package. In the embodiment shown, a rectangular six inch by four inch form factor is implemented, with a minimized height, as shown in FIGS. 2 and 6. In one embodiment, the height is about 1.5 inches; however, other shapes and sizes of warning lights are possible as well, consistent with the present disclosure.

In general, the warning light includes a base 108 used to mount the light to a motor vehicle, and a translucent cover 110 which allows light to be transmitted therethrough. As shown, the warning light 102 includes a plurality of signal wires 112 extending from an opening 109 in the base 108. The signal wires 112 are configured to receive control signals and power from an external source, such as an electrical system of a motor vehicle. The warning light 102 can be used on the motor vehicle, through use of the signal wires 112, as a turn signal or as some other type of warning indicator. Various additional features of the warning light 102 are described in greater detail in conjunction with FIGS. 8-12, below.

Referring back to FIGS. 1-4, the warning light frame 104 is shaped to surround a perimeter of the warning light 102, and is shaped to provide additional protective covering along the perimeter of the light. The warning light frame 104 can be made from metal, plastic, or any other generally weather resistant material, and is of a complementary size and shape to the warning light 102. In the embodiment shown, the warning light frame 104 flares outwardly from the base 108 of the warning light 102 and tapers toward the translucent cover 110. Optionally, a portion of the warning light frame 104 also wraps around the base 108 of the warning light 102, and can be used in attaching the warning light frame 104 to the warning light 102, such as using a fastener, such as a screw used to mount the warning light to a motor vehicle. Other configurations of the warning light frame 104 are possible as well.

Figure 20:
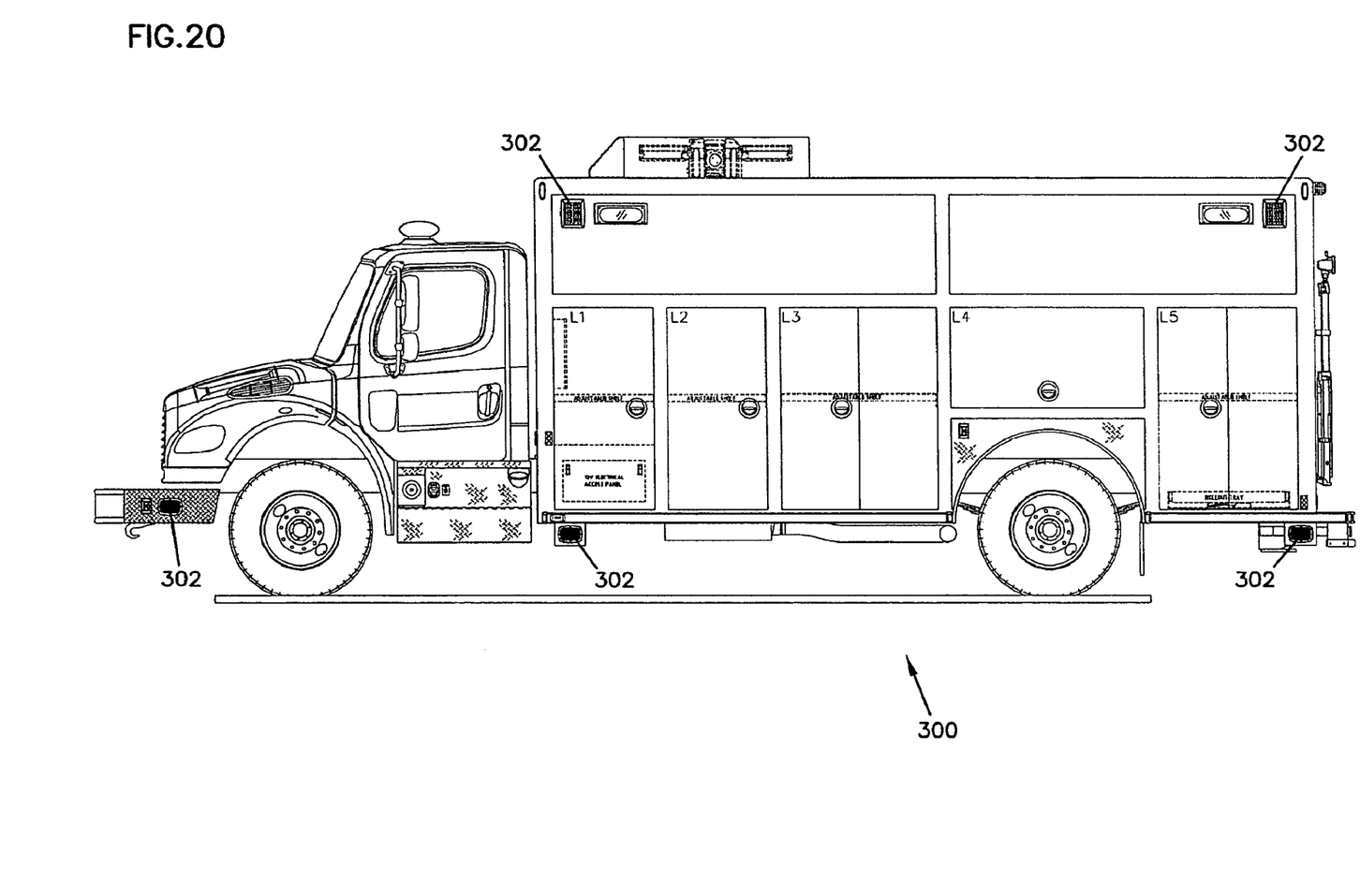
FIG. 20 is a side view of an emergency response vehicle with a plurality of warning light assemblies installed thereon.

The base plate 106 provides a mounting surface upon which the warning light 102 can be mounted. The base plate 106 can be constructed from plastic, rubber, or another generally resilient, waterproof material. In one embodiment, the base plate 106 is at least partially compressible to provide a cushioned layer between the base 108 of the light 102 and a rigid surface of a motor vehicle (as seen in FIG. 20, below), to provide some vibration resistance to the warning light. The base plate 106 includes an opening 107 therethrough to allow the signal wires 112 to pass from the base 108 of the warning light 102 into a motor vehicle for connection to an electrical control system.

A plurality of fixture locations 114 in the warning light 102, frame 104, and base plate 106 accept screws or other fasteners, which can be used to attach the light to the frame 104, base plate 106, and a vehicle (not shown). The fixture locations 114 in the warning light 102, frame 104, and base plate 106 are complementary, such that a screw or other fastener can pass through a corresponding fixture location 114 in each component to connect the assembly and to attach the assembly to a motor vehicle. In FIGS. 5-7, screws 115 pass through the fixture locations 114 to interconnect the components of the assembly 100 and to attach the assembly to a motor vehicle. In the embodiment shown, the fixture locations 114 are at the corners of the rectangular warning light. Other configurations of fixture locations or methods of affixing the warning light 102, frame 104, and base plate 106 together are possible as well, such as by use of adhesive or other methods.

Referring now to FIGS. 8-12, various aspects of the warning light 102 of FIGS. 5-7 are shown in greater detail. The warning light includes a base 108 and cover 110, which join at cooperating flanges 116, 118, respectively to form a housing having an interior cavity 120. The base 108 is generally rectangular, and forms a shallow plate in which the interior components reside. The base 108 includes, as previously discussed, a central opening 109 configured to allow signal wires 112 to pass therethrough. Optionally, a plug 122 closes the central opening 109 so as to environmentally seal the opening 109 with the signal wires 112 passing through the plug 122. The base 108 also includes a plurality of mounting locations 124 configured to allow mounting of components of the warning light 102 residing within the interior cavity 120 to the base 108. Mounting the interior components of the light 102 to the base 108 provides vibration resilience for the electronic and optical components within the warning light.

The cover 110 is domed, configured to cover the base 108 while maintaining a low profile form. In the embodiment shown, the warning light 102 is about one and a half inches thick when the cover 110 is installed. The cover 110 is manufactured from a translucent material, such as a plastic or glass composite material. In one embodiment, the cover is transparent, providing clear or nearly unaltered light emission from the components in the warning light 102 outward. In still other embodiments, the cover 110 is colored, providing a filtering effect to the light generated in the warning light 102.

Optionally, a gasket 126 resides between the flanges 116, 118 to assist in providing a substantially weatherproof seal between the base 108 and cover 110. The gasket 126 can be formed from rubber or other sealing material, and can reside within a channel in one or both of the flanges 116, 118. In the embodiment shown, the gasket 126 resides within a channel formed in the flange 116, and is compressed into the channel by the flange 118 of the cover. The gasket as shown includes fixture locations passing therethrough, similarly to the base 108 and cover 110.

An optional base plate 127 may be attached to the external face of the base 108, and also includes fixture locations 114 and an opening 109 therethrough, complementary to the base 108. The base plate 127 can provide additional cushioning from vibration of the warning light 102 when installed on a vehicle.

A number of electrical and optical components reside within the interior cavity 120 of the warning light 102. In the embodiment shown, a reflector 128 mounts to the base 108, holding a circuit board 130 therebetween. The reflector 128 and circuit board 130 attach to the base 108 by a plurality of screws 132 which engage the reflector 128 and the base 108 at the mounting locations 124, clamping the circuit board 130 in place. Other methods of affixing the reflector 128 and circuit board 130 within the warning light are possible as well.

The circuit board 130 has a base portion 134 and opposed side portions 136. The base portion 134 resides within the base 108, and includes control circuitry, such as a programmable circuit or other control systems, to trigger illumination of the light. The base portion 134 includes a connector 137 configured to attach to the signal lines 112, previously described. The side portions 136 extend toward the cover 110 from the base portion 134. Each side portion 136 includes a plurality of light emitting diodes (LEDs) 138 mounted thereon, preferably in a linear arrangement. The LEDs 138 can be any typical high output LED, such as a Lumileds Luxeon® LED. The LEDs 138 generally output substantially unidirectional light along an optical output axis, generally directly outward from the light emitting diode.

In the embodiment shown, five LEDs 138 are located on each side portion. The LEDs 138 are oriented toward the reflector 128, which is configured to disperse the light generated by the LEDs 138 at one or more angles to maximize visibility of the warning light 102. In the embodiment shown, the side portions 136 are perpendicular to the base portion 134, and the LEDs 138 are oriented in parallel on the opposed side portions 136. In such a configuration, the LEDs 138 are oriented such that the optical axis of the LEDs is perpendicular to the reflective surface of the reflector 128. In further embodiments, the side portions 136 extend at a non-perpendicular angle from the base portion 134 toward the cover 110. Other configurations are possible as well.

In the embodiment shown, the circuit board 130 is a metallized circuit board, in that one or more portions of the circuit board are clad in a metal sheath. The metallization and bent nature of the circuit board maximizes rigidity of the circuit board, thereby contributing to minimization of vibration, improvement of operational reliability, and improvement of heat dispersion from the LEDs 138 and other electrical components.

The reflector 128 is positioned to reflect light generated by the LEDs 138 and reflect that light at a plurality of angles, generally toward the cover 110. The reflector 128, as shown, includes opposed reflective surfaces which are generally parabolic and configured to provide improved visibility of the warning light as compared to prior art lighting and reflector systems incorporating LEDs. In a possible embodiment, the reflector 128 implements one or more of the various reflector profiles disclosed in U.S. patent application Ser. No. 11/712,769, filed Mar. 1, 2007 and entitled "Light Assembly", the disclosure of which is hereby incorporated by reference in its entirety. An exemplary reflector useable in the warning light 102, in which a particular reflector design is implemented, is described below in conjunction with FIGS. 13-19.

FIGS. 13-19 illustrate a reflector 200 useable in a warning light, such as the warning light 102 of FIGS. 8-12. The reflector 200 includes one or more reflective surfaces 202 having a curved section oriented generally perpendicularly to a light source, such as one or more LEDs as described above in conjunction with FIGS. 8-12. The reflector 200 as shown includes opposite, symmetrical reflective surfaces 202 configured to provide a selected symmetrical light output characteristic from the complementary sides of the reflector 200. The reflective surfaces 202 are generally parabolic and configured to reflect the light initially projected from one or more LEDs positioned on and oriented toward each side of the reflector upwardly at a plurality of angles. In one embodiment, the reflective surfaces include a plurality of reflective regions, such as one or more of the reflector designs disclosed in U.S. patent application Ser. No. 11/712,769, filed Mar. 1, 2007 and entitled "Light Assembly", which was previously incorporated by reference. Additional embodiments using other reflective surfaces designs are possible as well.

The reflector 200 also includes secondary reflective surfaces 204 located nearer the LEDs at the periphery of a warning light, the secondary reflective surfaces 204 designed to collect and redirect light from the LEDs toward a cover of a warning light, such as the cover 10 of FIGS. 1-12. As shown most clearly in FIG. 19, the inclusion of the reflective surfaces 204 increase the percentage of light from the LEDs which is usable for the given warning light requirements. Specifically, the reflective surfaces 204 reflects light that would otherwise be unreflected by the reflective surfaces 202, which do not extend the entire length to join the focal axis A, as shown.

These secondary reflective surfaces 204 can be parabolic or some other shape selected for dispersement of the directional light directed toward them from LEDs residing along both sides of the reflector 200. The secondary reflective surfaces 204 and reflective surfaces 202 coordinate to receive light from LEDs at different angles from LEDs, and redirect that light toward a translucent cover of a warning light, such as the cover 110 of FIGS. 1-12. Additional reflective surfaces can be included in the reflector 200 as well, depending upon desired light dispersion characteristics.

The reflector 200 generally has a hollow underside, and includes openings 206 in sides transverse to the reflective surfaces. The openings 206 and hollow underside allow airflow over elements residing under the reflector 200, such as a circuit board or electrical components of a warning light assembly.

The reflector 200 also includes a plurality of mounting locations 208 configured to receive screws for attachment into a warning light. In the embodiment shown, the Mounting locations correspond to the mounting locations 124 in the base 108 of the warning light 102 of FIGS. 5-12.

FIG. 20 is a side view of an emergency response vehicle 300 having warning lights 302 installed thereon. The warning lights 302 can be used to perform a variety of indicator functions, such as to indicate that the emergency response vehicle 300 is in transit to an emergency response location. Optionally, one or more of the warning lights 302 can be used as a turn signal. The warning lights 302 used on the emergency response vehicle 300 can emit different colors, such as by using colored light sources (LEDs) or other white light sources (incandescent, halogen, or other sources) and a colored lens or cover through which the light projects. In the embodiment shown, the warning lights 302 installed correspond to the warning light 102 described above in conjunction with FIGS. 4-12. Optionally, the warning lights 302 are installed as part of warning light assemblies, as described above in conjunction with FIGS. 1-4. Other configurations and mounting structures may be used as well.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A warning light comprising:
   a housing having a base and a translucent cover;
   an array of light emitting diodes extending along a linear axis within the housing, the light emitting diodes each operable to emit light substantially along parallel output axes; and
   a reflector resident within the housing, the reflector including a reflective surface extending parallel to the linear axis formed by the array of light emitting diodes and having a curve section disposed substantially perpendicularly to the parallel optical output axes of the array of light emitting diodes, the reflective surface including a plurality of parabolic reflective regions, each of the plurality of parabolic reflective regions configured to reflect at least a portion of light from one or more of the light emitting diodes in the array of light emitting diodes in a direction generally perpendicular to the parallel output axes and toward the translucent cover.

2. The warning light of claim 1, wherein the light emitting diodes are regularly spaced at a predetermined distance.

3. The warning light of claim 1, wherein the reflective surface is substantially parabolic.

4. The warning light of claim 1, wherein the reflector includes a second reflective surface symmetrical to the reflective surface.

5. The warning light of claim 4, further comprising two sets of light emitting diodes, each set of light emitting diodes oriented to a reflective surface of the reflector.

6. The warning light of clime 1, wherein the housing further includes a gasket residing within a channel along an edge of the base.

7. The warning light of claim 1, wherein the length of the base is about six inches and the width of the base is about four inches.

8. The warning light of claim 1, further comprising a metallized circuit board having opposing side portions extending away from the base.

9. A warning light comprising:
- a generally rectangular housing having a base and a translucent cover;
- a first plurality of light emitting diodes arranged in a linear array along a first side of the housing, the plurality of light emitting diodes mounted on a first circuit board and operable to emit light along first parallel output axes;
- a second plurality of light emitting diodes arranged in a linear array along a second side of the housing, opposite the first side, the second plurality of light emitting diodes mounted on a second circuit board and operable to emit light along second parallel output axes;
- a reflector within the housing, the reflector including first and second reflective surfaces, the first reflective surface parallel to the linear array of the first plurality of light emitting diodes and including a curve section disposed substantially perpendicularly to the first parallel output axes and the second reflective surface parallel to the linear array of the second plurality of light emitting diodes and including a curve section disposed substantially perpendicularly to the second parallel output axes, and each of the first and second reflective surfaces including a plurality of parabolic reflective regions arranged to reflect light from the first and second plurality of light emitting diodes toward the translucent cover.

10. The warning light of claim 9, further comprising:
- a first secondary reflective surface positioned to reflect light from the first plurality of light emitting diodes otherwise unreflected by the first reflective surface toward the translucent cover; and
- a second secondary reflective surface positioned to reflect light from the second plurality of light emitting diodes otherwise unreflected by the second reflective surface toward the translucent cover.

* * * * *